United States Patent [19]

Pedersen

[11] Patent Number: 4,805,487
[45] Date of Patent: Feb. 21, 1989

[54] SIDE GEAR MOUNTING FOR DIFFERENTIAL ASSEMBLY

[75] Inventor: Harry Pedersen, Rochester, N.Y.

[73] Assignee: The Gleason Works, Rochester, N.Y.

[21] Appl. No.: 111,906

[22] Filed: Oct. 23, 1987

[51] Int. Cl.$^4$ .............................................. F16H 1/38
[52] U.S. Cl. ........................................ 74/715; 74/710
[58] Field of Search ................................... 74/715, 710

[56]  References Cited

U.S. PATENT DOCUMENTS

| | | | |
|---|---|---|---|
| 1,090,082 | 3/1914 | Muehl | 74/715 |
| 1,195,314 | 8/1916 | Williams | 74/715 |
| 1,294,040 | 2/1919 | Brown | 74/715 |
| 1,373,657 | 4/1921 | Finefrock | 74/715 |
| 2,070,569 | 2/1937 | Asam | 74/715 |
| 2,203,683 | 6/1940 | Frederickson | 74/715 |
| 2,651,215 | 9/1953 | Schoenrock | 74/711 |
| 2,859,641 | 11/1958 | Gleasman | 74/715 |
| 2,972,265 | 2/1961 | Walter | 74/711 |
| 3,494,226 | 2/1970 | Biddle | 74/711 |
| 3,706,239 | 12/1972 | Myers | 74/715 |
| 3,893,351 | 7/1975 | Baremor | 74/710.5 |
| 4,191,071 | 3/1980 | Gleasman et al. | 74/715 |
| 4,269,086 | 5/1981 | Altmann | 74/711 |
| 4,365,524 | 12/1982 | Dissett et al. | 74/715 |
| 4,491,035 | 1/1985 | Gleasman et al. | 74/715 |
| 4,491,036 | 1/1985 | Stritzel | 74/715 |
| 4,495,835 | 1/1985 | Gleasman | 74/715 |
| 4,512,211 | 4/1985 | Stritzel | 74/745 |

FOREIGN PATENT DOCUMENTS 617012  3/1961  Canada .

Primary Examiner—Dirk Wright
Attorney, Agent, or Firm—Thomas B. Ryan; Ralph E. Harper; Morton A. Polster

[57] ABSTRACT

A differential gear assembly of the type including worm or helical-type gears mounted on crossed non-intersecting axes is provided wherein a pair of drive axles (12, 14) are received in bores (10) formed in the sides of a differential housing (4), and wherein axially aligned worm or side gears (18, 30) are coupled to each axle end for meshing engagement with torque transfer gears within said housing. One of the side gears (30) is provided with an outwardly directed flange (36) which overlaps an inwardly directed flange (42) associated with the housing to maintain the end faces of the side gears (18, 30) out of contact with each other to preclude axial thrust forces developed in one side gear (30) from passing to the other (18) and to eliminate frictional forces at the interface of the side gears, thereby reducing differences in bias ratios associated with opposite directions of differentiation without significantly reducing the overall bias ratio of the assembly.

15 Claims, 2 Drawing Sheets

SIDE GEAR MOUNTING FOR DIFFERENTIAL ASSEMBLY

TECHNICAL FIELD

The present invention relates to vehicle differential gear assemblies of the type which may include worm or helical-type gears mounted on crossed, non-intersecting axes and specifically, to a mounting arrangement for side, or axle drive, gears in such assemblies.

BACKGROUND

Conventional differential assemblies utilize four interengaged bevel gears that rotate about two orthogonal axes. In contrast, the differential assembly which is associated with this invention is of the type that does not utilize bevel gears, and is generally of the design shown in U.S. Pat. No. 2,859,641, issued Nov. 11, 1958 in the name of Gleasman. This patent is incorporated herein by reference to the extent necessary to provide specific details of the structure of the differential assembly.

This type of differential includes a gear housing, a pair of drive axles received in bores formed in the sides of the housing, and a differential gear arrangement mounted centrally in a main body portion of the housing for driving the axles. The rotatable gear housing body portion includes a flange formed at one end for receiving a ring gear or other means for providing power input to the differential from the drive shaft of the vehicle in a conventional manner. The gear housing typically is provided with a removable cap at its other end.

The gear arrangement includes a pair of helical worm or side gears, coupled to each axle end as drive gears, together with so called balancing or transfer gears associated with each of the side gears and in mesh with each other for transferring and dividing torque between the axle ends. The transfer gears are mounted in pairs within slots, or windows, formed in the main body portion of the housing, and each transfer gear of a pair rotates on an axis of rotation that is substantially parallel to a tangent of the envelope of an associated axle drive gear.

The transfer gears are in reality combination gears, i.e., the middle portion of each gear constitutes a worm wheel portion while the outer ends of the gear are formed with integral spur gear portions. The arrangement is such that, for any given pair of combination gears, the worm wheel portion of a first combination gear meshes with one side gear while the worm wheel portion of a second combination gear meshes with the other side gear, and the spur gear portions of the respective combination gears mesh with each other.

In one example of this type of differential assembly, a set of three combination gears are arranged substantially in a first single plane at approximately 120° intervals about the periphery of each side gear, each of the three combination gears being paired with a combination gear of a second set of three combination gears similarly arranged with respect to the second side gear in a second single plane parallel to the first plane.

The present invention relates to differential assemblies of the type described above, and particularly those in which the side gears have helix angles inclined in the same direction with respect to their axes of rotation. In such assemblies, when power is applied to the differential housing, both side gears are thrust in the same direction along their aligned axes toward one end of the differential gear housing. In this regard, it is to be noted that the side gear helix angles are generally selected so that when power is applied to the differential gear housing to effect forward movement of a vehicle, both side gears are thrust toward the flange end of the housing. This arrangement, however, produces different bias ratios for different directions of relative drive axle rotation. This invention seeks to reduce these differences without significantly affecting overall, or average, bias ratio for the differential assembly.

Prior to explaining the improved aspects of the differential assembly in accordance with this invention, a brief discussion of frictional resistance, bias ratio, and bias ratio imbalance will prove helpful to an understanding of the invention. For ease of discussion, the side gear closest to the flange end of the differential gear housing will be referred to as a "bottom" side gear; the side gear closest to the cap end of the housing will be referred to as a "top" side gear; and the flange end of the differential gear housing is assumed to be on the left side of the housing as viewed from the rear of the vehicle. Moreover, with respect to examples discussed herein, forward motion of the vehicle is assumed.

Bias ratio is a measure of torque distribution between drive axles which can be maintained by relatively rotating drive axles, and is expressed as a quotient of the amount of torque in the drive axle having the most torque divided by the amount of torque in the other drive axle. Bias ratio is produced by frictional resistance in a differential which restricts the transmission of torque between drive axles. Generally, frictional resistance causes a percentage reduction in the amount of torque that is transferable between drive axles. The magnitude of this reduction is proportional to the frictional resistance.

Torque transfer through the differential occurs from the drive axle having the larger amount of torque to the drive axle having the smaller amount of torque. Accordingly, the drive axle which includes the larger amount of torque may also be considered as the "input" axle and the drive axle which includes the smaller amount of torque may be considered as the "output" axle. In this context, the terms input and output refer only to transfers of torque between drive axles and are not related to torque transfers between the differential housing and the drive axles collectively.

It is known, for example, that the drive axle connected to the inside wheel in a turn exerts a greater resistance to rotation of the differential housing than the drive axle connected to the faster rotating outside wheel. Accordingly, in opposite directions of turns, one drive axle is loaded more than the other. That is, in one direction of relative drive axle rotation (e.g., a right turn) the drive axle coupled to the top side gear is loaded more than the drive axle coupled to the bottom side gear and, in the opposite direction of relative drive axle rotation (e.g., left turn), the drive axle coupled to the bottom side gear is loaded more than the drive axle coupled to the top side gear. This differential drive axle loading in opposite directions of relative drive axle rotation may result in different bias ratios being associated with such different directions of drive axle rotation. This condition is termed bias ratio imbalance.

Since the problem is one in which bias ratio is decidedly higher in one direction of relative drive axle rotation than the other, it may be understood that frictional resistance in the differential is greater in the direction of relative drive axle rotation associated with the higher bias. However, the same frictional surfaces are known to be in contact in both directions of relative rotation. Frictional forces generated by frictional surfaces are determined by the coefficients of friction of the respective contacting surfaces and the normal forces applied to the surfaces. Since the frictional properties of the contacting surfaces (i.e., coefficients of friction) do not change between opposite directions of drive axle rotation, it may be further understood that differences in frictional resistance between the opposite directions of drive axle rotation are associated with changes in the normal forces applied to the frictional surfaces.

In other words, in the high bias direction of relative drive axle rotation, normal forces applied to the frictional surfaces in the differential are generally higher than in the low bias direction of relative drive axle rotation. Forces are applied to the frictional surfaces of the differential largely because of reaction forces generated at the mounting surfaces of the gearing in the differential. While there are frictional forces generated at each gear mesh, it is understood that the problem of bias ratio imbalance originates at particular mounting surfaces. It is well known, for example, that in order for gears to transmit power, the gears must be supported with all of their reactions contained. Mounting surfaces within the differential have frictional properties, and the normal forces which are applied against the mounting surfaces are, in fact, reaction forces which are required to contain the differential gearing in its operative position. From the above, it follows that reaction forces within the differential required to contain the gearing are larger in the high bias direction of relative drive axle rotation than in the low bias direction.

Typically, the largest reaction forces generated within the differential are side gear thrust forces. It is known that such thrust forces may be calculated at the point of mesh on the side gears. A first component (tangential) of the force applied at the point of mesh either contributes to the rotation of the side gear or conveys rotation of the side gear to an enmeshed gear member, and a second component (axial) of the applied force thrusts the side gear in a direction along its axis. The ratio of the axial force to the tangential force is equal to the tangent function of the side gear helix angle as given by the equation below:

$$W_x/W_t = \tan(psi) \tag{1}$$

where "$W_x$" is the axial force, "$W_t$" is the tangential force and "psi" is the helix angle. Thus, the axial thrust of the side gears which must be constrained by mounting surfaces within the differential may be understood to be a product of the tangential driving force of each side gear multiplied by the tangent function of the respective side gear helix angles.

As may be expected, the reaction surfaces which constrain the axial thrust of the side gears are located opposite the end faces of the side gears. The interface between the bottom side gear and housing is used to constrain the axial movement of both the top side gear and bottom side gear. The interface between side gears is used to constrain axial movement of the top side gear.

The effect of the frictional forces generated at the side gear interfaces is to either (a) decrease the tangential driving load conveyed by a side gear or (b) increase the tangential driving load required to cause its rotation. Keeping in mind that the tangential driving loads associated with the two side gears are related through the side gear helix angle to the frictional resistance to relative drive axle rotation within the differential, it will be understood that the tangential driving loads associated with one direction of relative drive axle rotation are larger than the tangential driving loads associated with the opposite direction of relative drive axle rotation.

The problem may be simplified or reduced to its essential components by considering the differential to be frictionless except at the two side gear interfaces. In accordance with conventional practices, the two side gears may be considered to be equal in diameter and include equal helix angles. Under these conditions, the tangential driving loads of each side gear are equal in magnitude. Thus, it remains to be shown only that in one direction of relative drive axle rotation, the tangential driving loads are greater than in the opposite direction of relative drive axle rotation.

As previously explained, in one direction of relative drive axle rotation, the drive axle coupled to the top side gear is considered as "input" to the differential, i.e., the drive axle connected to the top side gear has the larger amount of torque. In this case, the tangential driving load acting at the mesh of the top side gear is reduced with respect to the load applied to the "input" axle by the amount of resistance to top side gear rotation developed at the interface between side gears.

This may be readily shown by way of an equation by taking advantage of a number of mathematical expedients. First, forces at the mesh of the respective side gears are considered to act at a unit distance from the side gear axis of rotation. This enables the interchange of units of force and torque. Second, the side gear helix angles may be considered equal to forty-five degrees. Since the tangent of forty-five degrees is equal to unity, tangential and axial forces acting at point of mesh of the side gears are equal. All frictional forces at the end faces of the side gears are also assumed to be acting at a unit radius as well. Accordingly, the tangential component of the top (and bottom) side gear mesh is equal to:

$$W_t = A_i - (W_t * u_2) \tag{2}$$

where $A_i$ is the input load or torque on the drive axle associated with the top side gear and $u_2$ is the coefficient of friction at the interface between the top side gear and the bottom side gear.

Since frictional forces have been discounted elsewhere in the differential, it is also now possible to express the tangential driving load of the bottom side gear in terms of its relationship with the output axle. The portion of the tangential load of the bottom side gear mesh which is received by the output axle is reduced by friction generated at both the interface between side gears as well as friction generated at the interface between the bottom side gear and the housing. This relationship may be expressed as follows:

$$W_t = A_o + 2(W_t * u_1) + (W_t * u_2) \tag{3}$$

where $A_o$ is the output load or torque on the drive axle associated with the bottom side gear and $u_1$ is the coefficient of friction at the interface between the bottom side gear and the differential housing. It is now possible to algebraically transform equations (2) and (3) as equalities of each axle torque.

$$A_i = W_t(1+u_2) \tag{4}$$

$$A_o = W_t(1-2u_1-u_2) \tag{5}$$

Thus, the bias ratio when the drive axle associated with the top side gear is considered as "input" may be expressed as follows:

$$\frac{A_i}{A_o} = \frac{1+u_2}{1-2u_1-u_2}. \tag{6}$$

In the opposite direction of differential rotation, the drive axle associated with the bottom side gear is considered input to the differential. The tangential driving load received by the bottom side gear is reduced by frictional forces acting to restrict bottom side gear rotation at both the interface between the bottom side gear and housing and the interface between side gears. This relationship may be summarized as follows:

$$W_t = A_i - 2(W_t{}^*u_1) - (W_t{}^*u_2). \tag{7}$$

It can now already be seen that the tangential driving load at the side gear mesh is reduced with respect to equation (2) by the term "$2(W_t{}^*u_1)$." Accordingly, it may be anticipated that frictional forces which resist the transfer of torque between drive axles are larger in the direction of relative drive axle rotation associated with the input axle being coupled to the top side gear.

Continuing the mathematical derivation, the tangential driving load at the side gear mesh may also be expressed in connection with the output axle associated with the top side gear. In this case, the output load or torque is reduced from the tangential driving load at the top side gear mesh by frictional forces generated at the interface between the side gears. This may be mathematically expressed as follows:

$$W_t = A_o + (W_t{}^*u_2). \tag{8}$$

Algebraic transformation may be used to set equations (7) and (8) equal to respective axle torques as follows:

$$A_i = W_t(1+2u_1+u_2) \tag{9}$$

$$A_o = W_t(1-u_2). \tag{10}$$

Thus, the bias ratio when the drive axle coupled to the bottom side gear is considered as input may be expressed as follows:

$$\frac{A_i}{A_o} = \frac{1+2u_1-u_2}{1-u_2}. \tag{11}$$

Given that the coefficients of friction do not change between opposite directions of drive axle rotation, it may now be demonstrated by comparison of equations (6) and (11) through the repetition of examples in the ordinary range of coefficient values (e.g., 0.01 to 0.2) that the bias ratio associated with input to the top side gear is larger than the bias ratio associated with input to the bottom side gear. The bias ratios between opposite directions of drive axle rotation tend to become closer in value but lower in magnitude as the coefficients of friction are reduced.

It is already known from U.S. Pat. No. 4,191,071 to reduce the coefficient of friction ($u_1$) at the interface between the bottom side and housing which has the effect of decreasing the difference between bias ratios associated with opposite directions of differential rotation. However, overall bias ratio is also reduced. This may be undesirable in applications in which higher bias ratios are needed. Further, there are practical limitations relating to cost and the availability of bearings which can sustain anticipated loads which limit the amount the coefficient of friction at this interface can be reduced.

Similar "torque equalizing" thrust bearings are disclosed in U.S. Pat. Nos. 4,491,035 and 2,859,641.

SUMMARY OF THE INVENTION

This invention minimizes bias ratio differences between opposite directions of differentiation without significantly reducing overall bias ratio. The invention proposes to flange mount the top side gear so hat when its axial thrust is directed toward the flange end of the housing, it is directly absorbed by the housing. This prevents the axial thrust of the top side gear from adding to the axial thrust of the bottom side gear at the interface between the bottom side gear and housing. This also prevents the top side gear from thrusting against the bottom side gear and generating frictional forces at the interface between the side gears.

In the proposed new arrangement, the tangential driving load at the side gear mesh is reduced with respect to the input torque of either axle by friction forces acting at a single end face of each side gear. In other words, the same form of equation may be used to determine the tangential driving loads which induce frictional resistance forces in the differential regardless of the direction of torque transfer through the differential (i.e., the direction of relative rotation of the drive axles). This may be seen from modifications made to equations (2) through (11) which reflect this new arrangement. The modified equations are listed below as equations (2a) through (11a):

$$W_t = A_i - (W_t{}^*u_3) \tag{2a}$$

$$W_t = A_o + (W_t{}^*u_1) \tag{3a}$$

$$A_i = W_t(1+u_3) \tag{4a}$$

$$A_o = W_t(1-u_1) \tag{5a}$$

$$\frac{A_i}{A_o} = \frac{1+u_3}{1-u_1} \tag{6a}$$

$$W_t = A_i - (W_t{}^*u_1) \tag{7a}$$

$$W_t = A_o + (W_t{}^*u_3) \tag{8a}$$

$$A_i = W_t(1+u_1) \tag{9a}$$

$$A_o = W_t(1-u_3) \tag{10a}$$

$$\frac{A_i}{A_o} = \frac{1+u_1}{1-u_3} \tag{11a}$$

where "$u_3$" is the coefficient of friction between the top side gear and housing.

According to this invention, the respective coefficients of friction of the side gear interfaces may be collectively increased or decreased to control overall bias ratio without creating an imbalance between bias ratios associated with opposite directions of differential rotation. Of course, if such an imbalance is desired, the coefficients at the respective side gear end faces may be independently adjusted. This would enable an increase or a decrease in bias ratio to be associated with either direction of relative drive axle rotation without undesirably affecting the overall bias ratio (i.e., average bias ratio) of the differential.

To further understand the structural aspects of this invention, it should be noted that in the prior art differentials of the type described herein, side gears mesh with associated combination gears in a relatively narrow band within the total axial length of the side gears. Nevertheless, it has been the practice to form teeth throughout the full axial length of the side gears.

In an exemplary embodiment of this invention, tooth surfaces of the top side gear extend axially from that end of the side gear closest to the bottom side gear, but only through a limited region of intended mesh with the associated combination gears. The remaining axial length of the top side gear, extending toward the cap end of the gear housing, includes a radially outwardly extending flange which overlies a clearance or relief groove located axially between the toothed region and the flange.

The differential gear housing itself is formed to receive an annular support ring between upper surfaces of the gear housing body portion and the gear housing end cap. The respective diameters of the top side gear flange and annular support ring are such that the side gear flange overlaps, and is therefore axially supported by, the support ring so as to provide a small clearance between the top and bottom side gears when assembled. It will be appreciated that the support ring further prevents the top side gear from moving axially toward the bottom side gear during forward movement of the vehicle.

With this arrangement, the axial thrust forces developed by the top side gear and directed toward the flange end of the housing, are absorbed by the differential housing through the support ring instead of through the bottom side gear. In addition, friction forces normally generated at the interface between the side gears are eliminated. In this manner, the previously described differences in bias ratio during opposite directions of differentiation are reduced, i.e., made more nearly equal, without undesirably affecting the overall, or average, bias ratio of the differential.

PRESENT BEST MODE FOR CARRYING OUT THE INVENTION

Figure 1:
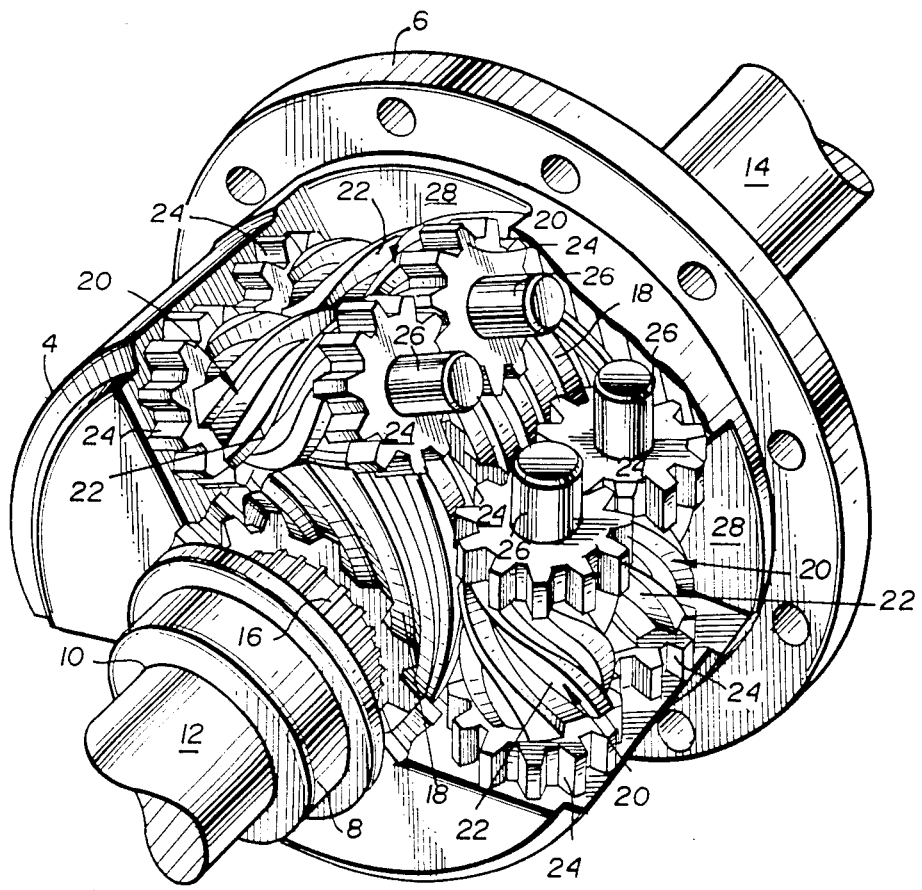
FIG. 1 is a perspective view of a known differential gear assembly, with parts broken away in section to show the internal gear structure.

Referring to FIG. 1, a known differential gear assembly generally similar to the differential gear assembly of this invention includes a differential gear housing 4 which includes an end cap 5 at one end and a flange 6 at the other end. The flange 6 is adapted to mount a ring gear (not shown) for receiving power input from the drive train of a vehicle in a conventional manner. The differential gear housing 4 also includes a pair of spaced apart trunnions 8 which are adapted to receive bearings by which the differential case is rotatably mounted inside a conventional axle housing.

The housing 4 also includes a pair of axle receiving bores 10 which are at least partially defined by the trunnions 8 and through which axle shaft ends 12, 14 extend into engagement with the differential gear assembly inside the main body portion of the housing. In particular, axle shaft ends 12, 14 include external splines 16 which engage mating internal splines of helical worm gears 18, 18', respectively. These worm gears are hereinafter referred to as side gears.

Each side gear 18 or 18' meshes with three balancing or transfer gears 20 which are arranged at 120° intervals about the periphery of the associated side gear, and which are arranged generally tangentially to, and in engagement with, the pitch surface of the side gear. It is understood with reference to FIG. 1, that only two of the three transfer gears associated with each side gear 18 or 18' are shown. Each of these transfer gears, hereinafter referred to as combination gears, is formed with a middle portion which constitutes an hourglass worm wheel portion 22 and integral end portions which constitute spur gear portions 24. It will thus be appreciated that each side gear meshes with worm wheel portions 22 of three associated combination gears 20. At the same time, the spur gear portions 24 of each combination gear associated with one side gear mesh with the spur gear portions of adjacent combination gears associated with the other of the two side gears. It is this arrangement, sometimes termed a "crossed-axis compound planetary gear complex" which transfers and divides torque between axle shaft ends 12, 14.

Each combination gear 20 is mounted for rotation about a shaft 26, the ends of which extend beyond the gear and serve to mount the gear within the main body portion of the gear housing 4. Since each of the three combination gears 20 associated with one side gear 18 is paired with a combination gear associated with the other side gear, the gear housing 4 is formed with three peripherally arranged "windows" or slots 28 extending radially inwardly from the periphery of the housing 4, each window or slot 28 receiving and mounting one pair of combination gears.

As further illustrated in FIG. 1, the helix angles of the respective side gears 18, 18' are inclined in the same direction with respect to their axes of rotation.

Consistent with the previous discussion, side gear 18', closest to the gear housing flange 6, is referred to herein as the bottom side gear, and side gear 18, closest to the end cap 5, is referred to herein as the top side gear.

Figure 2:
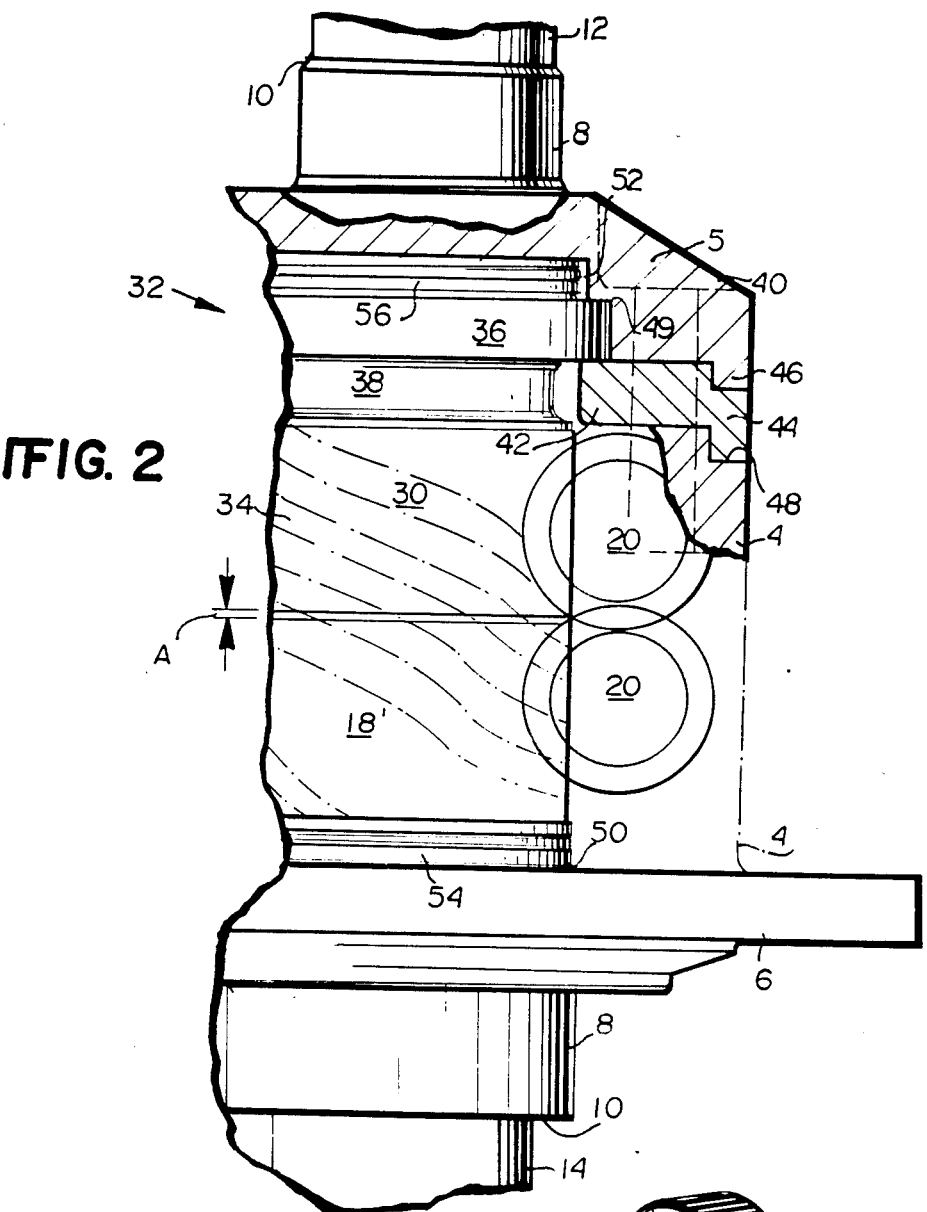
FIG. 2 is a partial cross-sectional view of an improved differential gear assembly in accordance with an exemplary embodiment of this invention.
Figure 3:
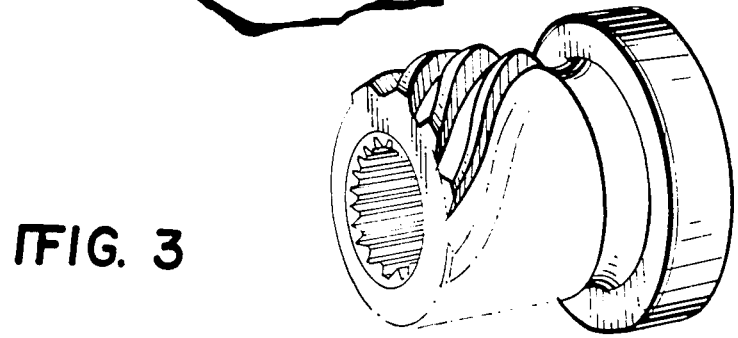
FIG. 3 is a perspective view of a side gear for use in the differential gear assembly illustrated in FIG. 2.

Referring now to FIG. 2, a differential gear assembly in accordance with this invention is shown wherein elements in common with the prior art gear assembly shown in FIG. 1 are designated by like reference numerals.

Axle ends 12 and 14 are splined to a pair of side gears 18', 30 within a gear housing 4. As in the known differential shown in FIG. 1, the bottom side gear 18' meshes with a set of three combination gears 20 (only one of which is shown in FIG. 2), arranged at 120° intervals about the side gear. Similarly, top side gear 30, constructed in accordance with this invention, meshes with a second set of three combination gears arranged about the periphery of the top side gear in a like manner.

Top side gear 30 differs from the top side gear 18 of the prior art differential assembly in several respects.

For example, the axial length along which the toothed surface 34 extends is somewhat shorter relative to the toothed surface of the opposing side gear 18'. This shortened tooth surface region on the top side gear 30, formed on the end of the gear closest to bottom side gear 18', is nevertheless sufficient to accommodate meshing engagement with associated combination gears 20 as in the prior art configuration.

At an end 32 closest to the end cap 40, the top side gear 30 is provided with an annular flange 36 which extends radially outwardly beyond the outside diameter of the toothed surface portion 34. Between toothed portion 34 and flange 36, there is formed a clearance or relief groove portion 38 having a diameter less than the outside diameter of the toothed portion. The groove 38 is formed with generous fillet radii to reduce stresses in the area and to provide partial relief to accommodate the hob which forms the tooth portion 34. The top side gear 30 is mounted in the gear housing 4 in a manner described hereinbelow.

The end cap 40 of the differential housing has been designed to permit an annular side gear support ring 42 to be mounted between the main body portion of the gear housing 4 and the end cap 40. The support ring 42 is a solid, annular metal member provided with an offset outer peripheral portion 44 which receives a depending flange 46 formed on the end cap 40, and which engages a notched or recessed area 48 on the body portion of the gear housing 4. End cap 40 is also provided with an annular, notch-like recess 49 formed interiorly thereof for receiving the top side gear flange 36, as best illustrated in FIG. 2.

The support ring 42 extends radially inwardly a distance which, when the differential is assembled, overlaps the radially outwardly extending flange 36 of the side gear 30. It is, of course, desirable to maximize the overlap between support ring 42 and flange 36. In this way, side gear 30 is axially supported by the annular ring 42 so as to be maintained in an axially spaced relationship with respect to the opposing bottom side gear 18'. The axial spacing between the aligned side gear 18', 30, designated A in FIG. 2, is preferably on the order of a few thousandths of an inch. It will be further understood that support ring 42 prevents the top side gear 30 from moving axially toward bottom side gear 18' at all times and under all conditions of operation of the gear assembly.

As is also shown in FIG. 2, the lower end of gear housing 4, as well as the end cap 40, are provided with axially aligned, annular recesses 50, 52, respectively, for receiving a plurality of washers 54, 56. Utilization of upper and lower washer assemblies of this type is not new per se and, in this regard, reference is made to prior U.S. Pat. Nos. 4,512,211 and 4,191,071.

By the above-disclosed arrangement, axial thrust forces developed by the top side gear are prevented from passing to the bottom side gear by the usual direct or indirect engagement of the side gears at their respective end faces. Rather, in accordance with this invention, axial thrust forces developed by the top side gear and directed toward the bottom side gear are absorbed by the differential housing via the support ring. In addition, frictional resistance to rotation at the side gear interface is eliminated and, as a result, differences in bias ratio associated with opposite directions of differentiation are reduced, i.e., the bias ratios are made more nearly equal, without significant adverse effect on the overall bias ratio. As a result, vehicle handling is more uniform and predictable throughout an full range of operating conditions.

While the invention has been described in what is presently regarded as its most practical embodiment, those of ordinary skill in the art will appreciate that various changes and modifications may be made which will nevertheless remain within the spirit and scope of the invention as defined by the claims which follow.

What is claimed is:

1. A differential gear assembly of the type which includes a differential gear housing having means for receiving a pair of axle ends together with a pair of substantially axially aligned side gears coupled to said pair of axle ends for rotation therewith, said side gears having helix angles inclined in the same direction with respect to the axes of rotation thereof, characterized in that the gear assembly includes means for preventing axial thrust forces developed by one of said side gears from loading the other of said side gears; said preventing means includes means for separating said side gears such that there is no direct or indirect engagement between confronting end faces of said side gears when thrust forces of said one of said side gears are directed toward said other of said side gears; and said means for axially separating the side gears includes a pair of overlapping elements associated with one of said side gears and said gear housing.

2. A differential gear assembly as defined in claim 1 and further characterized in that one of said pair of overlapping elements comprises a radially outwardly extending flange formed on one of said side gears, and the other of said overlapping elements comprises an annular support ring associated with said gear housing, said annular support ring comprising first and second radial portions, a first of said portions axially offset from a second of said portions.

3. A differential assembly as defined in claim 1, wherein said differential gear housing is provided with a flanged end adapted to mount a ring gear for receiving power input, and wherein said side gear helix angles are selected so that when power is applied to the differential housing to effect forward movement of a vehicle, said side gears are thrust toward said flanged end of said gear housing, and further characterized in that said one of said side gears is coupled to the axle end received in an end of said housing opposite said flanged end.

4. A differential gear assembly for a vehicle comprising a differential gear housing provided with a flange at one end thereof adapted to receive a ring gear; means for receiving a pair of axle ends: substantially axially aligned side gears disposed within said housing and rotatably coupled to said axle ends, said side gears having helix angles inclined in the same direction with respect to their respective axes of rotation; at least two combination gears associated with each said side gear, each of said combination gears including a centrally located worm wheel portion and spur gear portions formed at either end thereof, said combination gears being arranged in at least two pairs such that with respect to each pair, the worm wheel portion of one combination gear of a pair meshes with one side gear and the worm wheel portion of the other combination gear of the pair meshes with the other side gear, the spur gear portions of one combination gear of the pair meshing with the spur gear portions of the other combination gear of the pair, each said combination gear pairs arranged tangentially to the periphery of the worm gear and rotatably mounted in a gear window formed in said housing, said gear assembly characterized by means for axially separating said side gears such that there is neither direct nor indirect axial contact therebetween during conditions when side gear thrust is directed toward said one end of said housing.

5. A differential gear assembly as defined in claim 4 further characterized in that said means includes an annular, radially outwardly extending flange formed on one of said side gears, and a radially inwardly directed flange associated with said gear housing, wherein said radially outwardly and inwardly extending flanges overlap.

6. A differential gear assembly as defined in claim 5 further characterized in that said radially inwardly extending flange is an integral part of an annular support ring mounted on said differential housing.

7. A differential gear assembly as defined in claim 6, further characterized in that said radially outwardly directed flange is axially spaced from a toothed surface region of said one side gear.

8. A differential gear assembly as defined in claim 7, further characterized in that said one side gear includes a relief groove located between said outwardly directed flange and said toothed surface region.

9. A differential assembly as defined in claim 8, further characterized in that said relief groove has a diameter less than the toothed surface portion of said one side gear.

10. A vehicle differential gear assembly of the type including a differential gear housing provided with a flange at one end thereof adapted for engagement with power input means, said housing also including means for receiving a pair of substantially axially aligned rotatable axle ends; a top side gear disposed within said housing and coupled to one of said axle ends for rotation therewith; a bottom side gear disposed within said housing and rotatably coupled to the other of said axle ends for rotation therewith, said bottom side gear located adjacent said gear housing flange; said top and bottom side gears rotatable about substantially aligned axes of rotation and having helix angles inclined in the same direction with respect to said axles of rotation such that, during forward movement of said vehicle, said top and bottom side gears are axially thrust toward said one end of said housing provided with said flange, said assembly characterized by means for preventing axial thrust forces in said top side gear from loading said bottom side gear, and for eliminating frictional forces at the interface between said top and bottom side gears; and said preventing means includes means on said top side gear for maintaining axial separation between said top side gear and said bottom side gear.

11. The differential assembly defined in claim 10 and further characterized in that said means on said top side gear comprises a radially outwardly extending flange.

12. The differential assembly defined in claim 11 and further characterized in that said radially outwardly extending flange is in engagement with a radially inwardly directed flange associated with said housing.

13. A vehicle differential gear assembly of the type including a differential gear housing provided with a flange at one end thereof adapted for engagement with power input means, said housing also including means for receiving a pair of substantially axially aligned rotatable axle ends; a top side gear disposed within said housing and coupled to one of said axle ends for rotation therewith; a bottom side gear disposed within said housing and rotatably coupled to the other of said axle ends for rotation therewith, said bottom side gear located adjacent said gear housing flange; said top and bottom side gears rotatable about substantially aligned axes of rotation and having helix angles inclined in the same direction with respect to said axes of rotation such that, during forward movement of said vehicle, said top and bottom side gears are axially thrust toward said one end of said housing provided with said flange said assembly characterized by means associated with said top side gear for reducing differences in bias ratios associated with opposite directions of differentiation, without significantly reducing the overall bias ratio of the assembly; and said means associated with said top side gear include flange means for maintaining axial clearance between said top and bottom side gears when side gear thrust is directed toward said bottom side gear.

14. A differential assembly as defined in claim 13 and further characterized in that said top side gear is formed with a toothed surface region extending only partially along its length, said flange means extending radially outwardly from one end of said top side gear remote from said toothed surface region.

15. A differential assembly as defined in claim 14 and further characterized in that a relief groove is formed in said top side gear axially between said flange means and said toothed surface region.

* * * * *

UNITED STATES PATENT AND TRADEMARK OFFICE
CERTIFICATE OF CORRECTION

PATENT NO. : 4,805,487
DATED : February 21, 1989
INVENTOR(S) : Harry Pedersen

It is certified that error appears in the above-identified patent and that said Letters Patent is hereby corrected as shown below:

Column 5, equation 11, that portion of the equation reading "$1 + 2u_1 - u_2$" should read --$1 + 2u_1 + u_2$--.

Signed and Sealed this

Thirty-first Day of December, 1991

*Attest:*

HARRY F. MANBECK, JR.

*Attesting Officer*      *Commissioner of Patents and Trademarks*